United States Patent
Jeong et al.

(10) Patent No.: US 10,300,910 B2
(45) Date of Patent: May 28, 2019

(54) APPARATUS FOR DRIVING REAR-WHEELS OF ENVIRONMENT-FRIENDLY VEHICLE

(71) Applicant: Hyundai Dymos Incorporated, Chungcheongnam-do (KR)

(72) Inventors: Hee Cheon Jeong, Incheon (KR); Geun Ho Kim, Seoul (KR); Sang Gi Lee, Gyeonggi-do (KR); Moon Sik Woo, Gyeonggi-do (KR)

(73) Assignee: Hyundai Dymos Incorporated, Chungcheongnam-do (KR)

( * ) Notice: Subject to any disclaimer, the term of this patent is extended or adjusted under 35 U.S.C. 154(b) by 85 days.

(21) Appl. No.: 15/641,438

(22) Filed: Jul. 5, 2017

(65) Prior Publication Data
US 2018/0009435 A1    Jan. 11, 2018

(30) Foreign Application Priority Data
Jul. 6, 2016    (KR) .......................... 10-2016-0085606

(51) Int. Cl.
*B60K 1/02*    (2006.01)
*B60W 30/045*    (2012.01)
(Continued)

(52) U.S. Cl.
CPC ............. *B60W 30/045* (2013.01); *B60K 1/02* (2013.01); *B60K 6/48* (2013.01); *B60K 7/0007* (2013.01);
(Continued)

(58) Field of Classification Search
CPC ............. B60W 30/045; B60W 30/188; B60W 30/18145; B60W 20/00; B60W 10/115;
(Continued)

(56) References Cited

U.S. PATENT DOCUMENTS 5,168,946 A * 12/1992 Dorgan .................... B60K 1/02
                                                              180/6.44
8,585,525 B2 * 11/2013 Ushiroda ................. B60K 1/02
                                                              180/65.6
(Continued)

FOREIGN PATENT DOCUMENTS

KR    10-2013-0005407    1/2013

*Primary Examiner* — David J Hlavka
(74) *Attorney, Agent, or Firm* — Harness, Dickey & Pierce, P.L.C.

(57) ABSTRACT

Disclosed herein is an apparatus for driving rear-wheels of an environment-friendly vehicle. The apparatus for driving rear-wheels may include: a rear-wheel driver including a first motor and a second motor configured to respectively drive first and second rear wheels; a rear-wheel reducer configured to decelerate drive forces of the first and second motors and transmit the respective decelerated drive forces to the first and second rear wheels; a brake configured to releasably fix the rear-wheel reducer to a vehicle body; and a controller configured to control the rear-wheel driver, the rear-wheel reducer, and the brake. The rear-wheel reducer may include: a first planetary gear set disposed between an output end of the first motor and the first rear wheel; a second planetary gear set disposed between an output end of the second motor and the second rear wheel; and a ring gear coupled to the first and second planetary gear sets.

8 Claims, 4 Drawing Sheets

(51) Int. Cl.
  *B60K 6/48*     (2007.10)
  *B60K 17/04*    (2006.01)
  *B60K 17/354*   (2006.01)
  *B60K 17/356*   (2006.01)
  *B60W 10/08*    (2006.01)
  *B60W 10/115*   (2012.01)
  *B60W 20/00*    (2016.01)
  *B60W 30/18*    (2012.01)
  *B60W 30/188*   (2012.01)
  *B60K 7/00*     (2006.01)
  *B60K 6/52*     (2007.10)

(52) U.S. Cl.
  CPC .......... *B60K 17/046* (2013.01); *B60K 17/354* (2013.01); *B60K 17/356* (2013.01); *B60W 10/08* (2013.01); *B60W 10/115* (2013.01); *B60W 20/00* (2013.01); *B60W 30/188* (2013.01); *B60W 30/18145* (2013.01); *B60K 6/52* (2013.01); *B60K 2007/0038* (2013.01); *B60K 2007/0092* (2013.01); *B60W 2720/406* (2013.01); *B60Y 2200/92* (2013.01); *B60Y 2300/82* (2013.01); *Y02T 10/6265* (2013.01); *Y10S 903/911* (2013.01); *Y10S 903/93* (2013.01); *Y10S 903/945* (2013.01)

(58) Field of Classification Search
  CPC ............ B60W 10/08; B60W 2720/406; B60K 7/0007; B60K 17/354; B60K 17/356; B60K 17/046; B60K 1/02; B60K 6/48; B60K 6/52; B60K 2007/0038; B60K 2007/0092; B60Y 2300/82; B60Y 2200/92; Y10S 903/945; Y10S 903/911; Y10S 903/93
  See application file for complete search history.

(56) References Cited

U.S. PATENT DOCUMENTS

| | | | |
|---|---|---|---|
| 2012/0015772 A1* | 1/2012 | Kira | B60W 20/13 475/149 |
| 2016/0230841 A1* | 8/2016 | Hiramatsu | F16D 48/06 |
| 2016/0288779 A1* | 10/2016 | Kotloski | F16H 3/728 |

\* cited by examiner

APPARATUS FOR DRIVING REAR-WHEELS OF ENVIRONMENT-FRIENDLY VEHICLE

BACKGROUND OF THE INVENTION

Field of the Invention

Exemplary embodiments of the present invention relate to an apparatus for driving rear-wheels of an environment-friendly vehicle, and more particularly, to an apparatus for driving rear-wheels of an environment-friendly vehicle which includes drive motors provided at opposite sides to independently drive respective opposite rear wheels of the vehicle, thus enhancing the longitudinal drive force of the vehicle, and improving the handling stability of the vehicle.

Description of the Related Art

To make conventional front-wheel-drive environment-friendly vehicles such as a hybrid electric vehicle, a plug-in hybrid electric vehicle, an electric vehicle, and a hydrogen fuel cell vehicle have a four-wheel-drive structure, a drive apparatus formed of a combination of a motor and a reducer is mounted to a rear wheel axle so that the drivability of a four-wheel-drive vehicle can be enhanced, and the stability of the vehicle can be secured even when the vehicle moves on a snow-covered road.

The conventional apparatus for driving rear-wheels of includes a drive motor which typically operates with a high voltage, a reducer for securing a final drive gear ratio of a vehicle, and a clutch or brake which employs wet-type multiple frictional disks configured to remove unnecessary rotational resistance of the motor in a high-speed driving mode.

In Korean Patent Unexamined Publication No. 10-2013-0005407, there was proposed a technique for embodying four-wheel drive of an environment-friendly vehicle using a single drive motor for rear-wheel drive, a planetary gear train for decelerating of the drive motor, and a differential gear coupled to an output end of the planetary gear train.

The configuration proposed in the foregoing document is limited to a control operation for enhancing longitudinal drive force of front wheels and rear wheels in the same manner as that of typical four-wheel drive vehicles.

Therefore, such a rear-wheel drive method using a single drive motor cannot contribute to the handling stability of a vehicle under conditions in which there is the need of separately controlling drive forces of the opposite rear wheels, e.g., when the vehicle rapidly changes the lane.

PRIOR ART DOCUMENT

Patent Document (Patent document 1) Korean Patent Unexamined Publication No. 10-2013-0005407

SUMMARY OF THE INVENTION

An object of the present invention is to provide to an apparatus for driving rear-wheels of an environment-friendly vehicle which includes drive motors provided at opposite sides to independently drive respective opposite rear wheels of the vehicle, thus enhancing the longitudinal drive force of the vehicle, and improving the handling stability of the vehicle.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, an apparatus for driving rear-wheels of an environment-friendly vehicle which is configured to independently drive each of a first rear wheel and a second rear wheel of a vehicle, the apparatus including: a rear-wheel driver including a first motor configured to drive the first rear wheel, and a second motor configured to drive the second rear wheel; a rear-wheel reducer configured to decelerate drive force of the first motor and drive force of the second motor and transmit the respective decelerated drive forces to the first rear wheel and the second rear wheel; a brake configured to releasably fix the rear-wheel reducer to a vehicle body; and a controller configured to control the rear-wheel driver, the rear-wheel reducer, and the brake such that the first rear wheel and the second rear wheel are independently operated. The rear-wheel reducer may include: a first planetary gear set disposed between an output end of the first motor and the first rear wheel; a second planetary gear set disposed between an output end of the second motor and the second rear wheel; and a ring gear coupled at respective opposite sides thereof to the first planetary gear set and the second planetary gear set.

The brake may be provided between the ring gear and the vehicle body and configured to releasably fix the ring gear to the vehicle body.

The first planetary gear set may include: a first carrier coupled to the output end of the first motor; a first sun gear coupled to the first rear wheel; and a plurality of first planetary gears engaging with an outer circumferential surface of the first sun gear and an inner circumferential surface of the ring gear. The second planetary gear set may include: a second carrier coupled to the output end of the second motor; a second sun gear coupled to the second rear wheel; and a plurality of second planetary gears engaging with an outer circumferential surface of the second sun gear and the inner circumferential surface of the ring gear.

The controller may include: a motor control unit configured to independently supply drive force to each of the first and second motors; a hydraulic pressure controller configured to generate hydraulic pressure and supply the hydraulic pressure to the brake; and a vehicle control unit electrically coupled to the motor control unit and the hydraulic pressure controller and configured to control operation of the motor control unit and operation of the hydraulic pressure controller.

The first rear wheel may correspond to a left rear wheel, and the second rear wheel may correspond to a right rear wheel.

When an intention of a driver to rapidly change a direction of the vehicle to the left with respect to a movement direction of the vehicle is detected while the vehicle moves, the vehicle control unit may calculate a rotational moment of the vehicle, and transmit, to the motor control unit, a control signal for supplying power to the second motor for driving the second rear wheel, and then transmit a control signal to the motor control unit such that power is not supplied to the first motor for driving the first rear wheel.

The vehicle control unit may control the motor control unit such that energy is recovered from the first rear wheel using the first motor.

When an intention of a driver to rapidly change a direction of the vehicle to the right with respect to a movement direction of the vehicle is detected while the vehicle moves, the vehicle control unit may calculate a rotational moment of the vehicle, and transmit, to the motor control unit, a control signal for supplying power to the first motor for driving the first rear wheel, and then transmit a control signal to the motor control unit such that power is not supplied to the second motor for driving the second rear wheel.

The vehicle control unit may control the motor control unit such that energy is recovered from the second rear wheel using the second motor.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Embodiments of the present invention will be described with reference to the attached drawings. The size of each element, the thickness of lines indicating the element, etc. may be exaggerated for the purpose of clarity and convenience of description. The terms and words used for elements in the description of the present invention are defined based on the functions of the elements in the present invention. The terms and words may be changed depending on the intention or custom of users or operators, so that they must be defined based on the whole content of the present specification.

Figure 1:
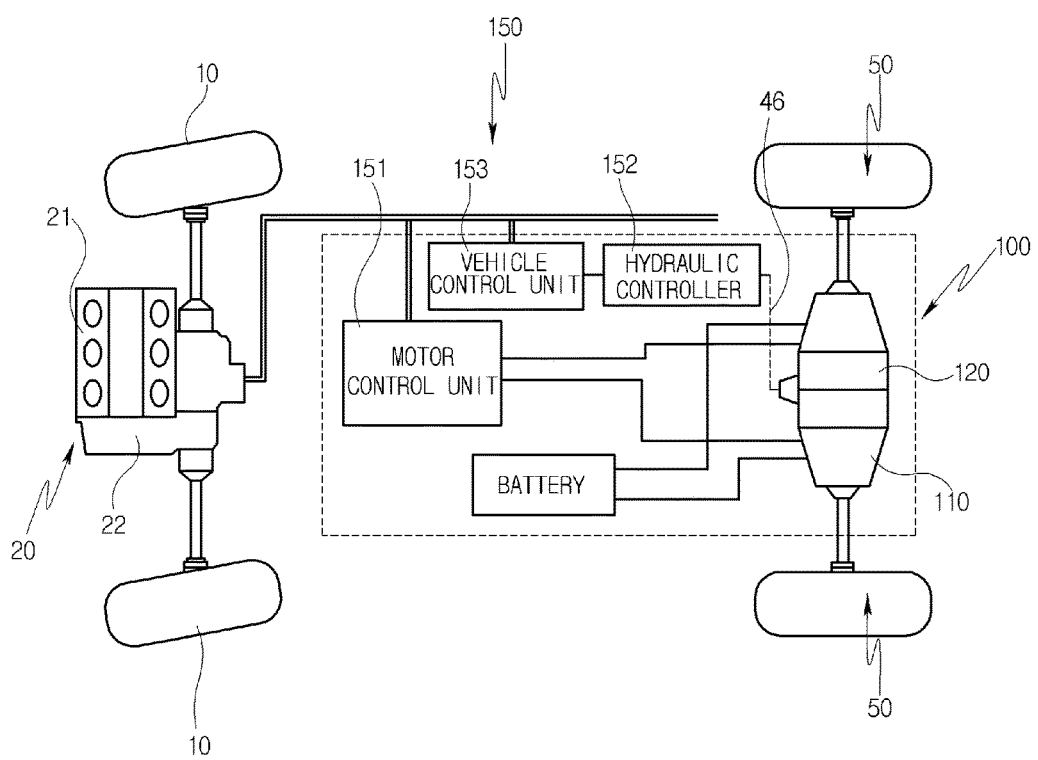
FIG. 1 is a view illustrating an environment-friendly vehicle with an apparatus for driving rear-wheels in accordance with an embodiment of the present invention.
Figure 2:
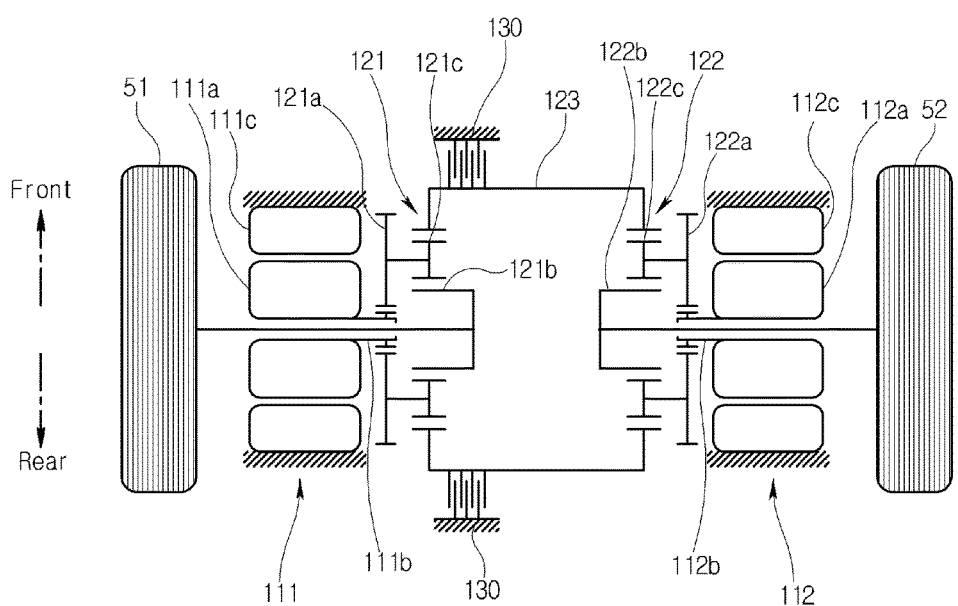
FIG. 2 is a view illustrating a rear-wheel driver and a rear-wheel reducer of the apparatus for driving rear-wheels in accordance with an embodiment of the present invention.
Figure 3:
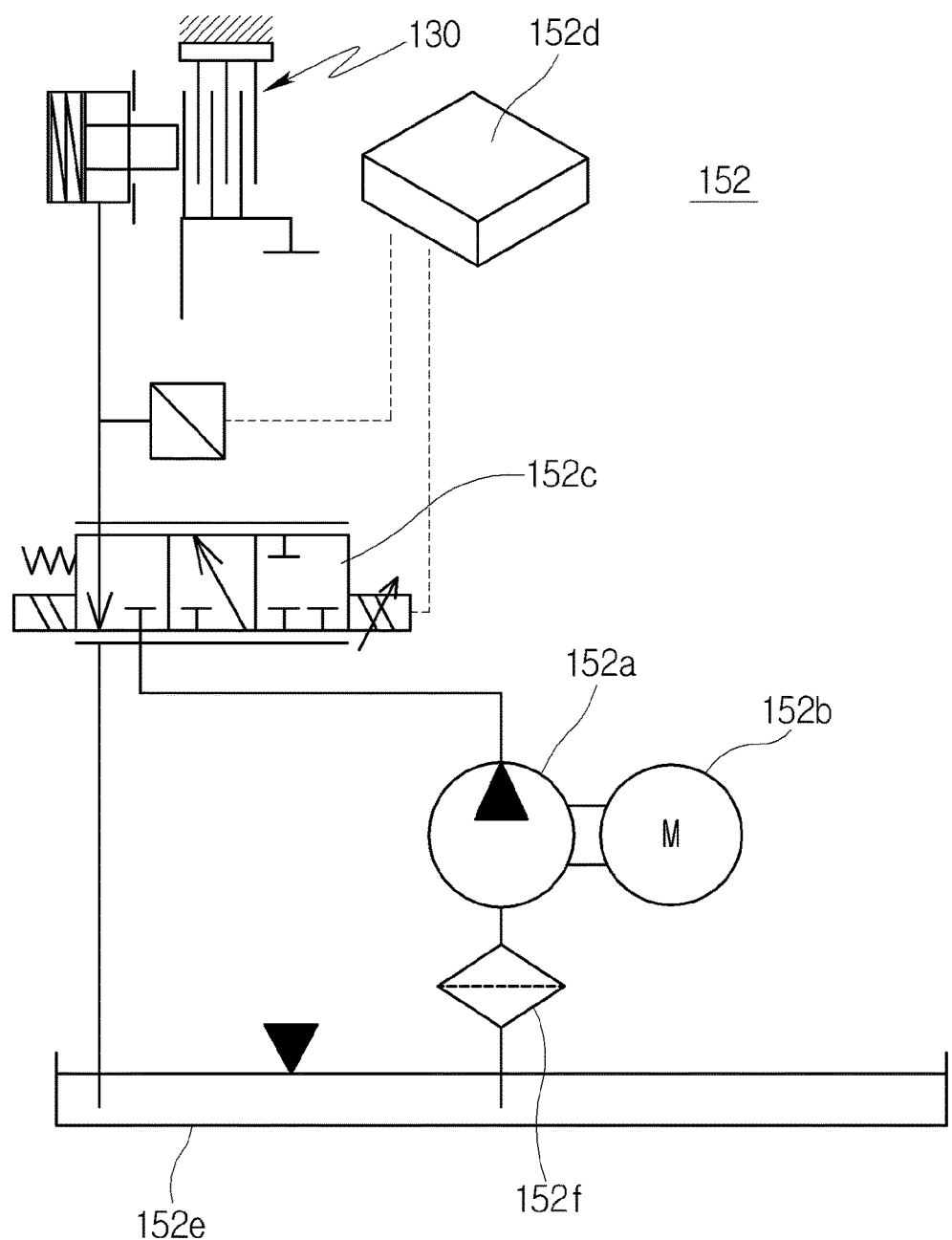
FIG. 3 is a view illustrating a hydraulic pressure controller of the apparatus for driving rear-wheels of FIG. 2.
Figure 4:
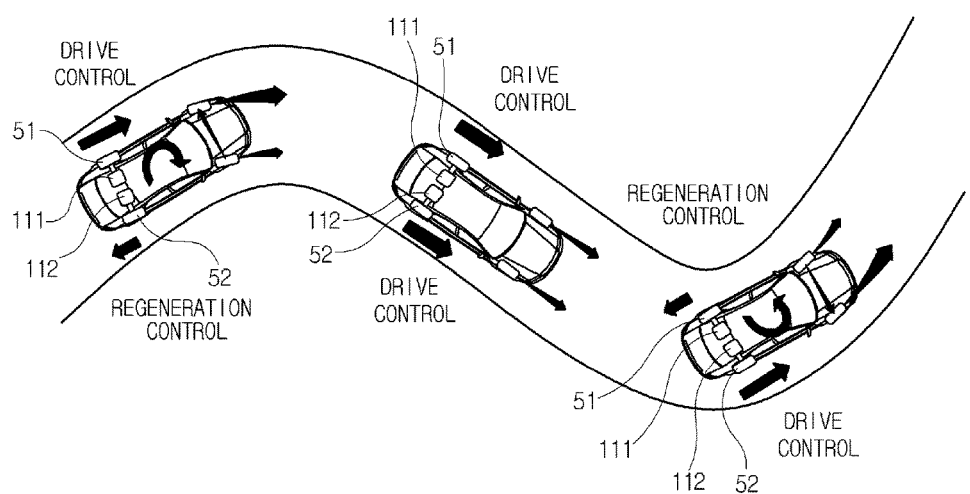
FIG. 4 is a view illustrating the operation of the apparatus driving rear-wheels of FIG. 2.

FIG. 1 is a view illustrating the configuration of an environment-friendly vehicle with an apparatus for driving rear-wheels in accordance with an embodiment of the present invention. FIG. 2 is a view illustrating a rear-wheel driver and a rear-wheel reducer of the apparatus for driving rear-wheels in accordance with an embodiment of the present invention. FIG. 3 is a view illustrating a hydraulic pressure controller of the apparatus for driving rear-wheels of FIG. 2. FIG. 4 is a view illustrating the operation of the apparatus for driving rear-wheels of FIG. 2.

As shown in FIG. 1, the vehicle may include an apparatus 20 for driving front-wheels configured to drive front wheels 10, and an apparatus 100 for driving rear-wheels configured to drive rear wheels 50.

The apparatus 20 for driving front-wheels has a purpose of driving only the front wheels 10, and the power of the apparatus 20 for driving front-wheels is not transmitted to the rear wheels 50.

The apparatus 20 for driving front-wheels includes a front-wheel driver 21 which is formed of a typical internal combustion engine or an electric motor or formed of both, depending on a type of the vehicle or a drive system type thereof, and a transmission unit 22 which decelerates the power of the front-wheel driver 21 and transmits the decelerated power to the front wheels 10.

The operation of the front-wheel driver 21 and the transmission unit 22 of the apparatus 20 for driving front-wheels is controlled by a vehicle controller 153, which will be described later herein.

The apparatus 100 for driving rear-wheels has a purpose of driving only the rear wheels 50, and the power of the apparatus for rear-wheels 100 is not transmitted to the apparatus 20 for driving front-wheels.

The apparatus 100 for driving rear-wheels in accordance with an embodiment of the present invention includes a rear-wheel driver 110 which independently drives each of the opposite rear wheels 50, and a rear-wheel reducer 120 which independently decelerates the drive force of the rear-wheel driver 110 and transmits the decelerated drive force to the opposite rear wheels 50.

The rear-wheel driver 110 includes a first motor 111 which independently drives a first rear wheel 51, and a second motor 112 which independently drives a second rear wheel 52. The rear-wheel reducer 120 includes a unit for independently decelerating the drive force of each of the first and second motors 111 and 112.

Detailed configurations of the rear-wheel driver 110 and the rear-wheel reducer 120 will be described later with reference to FIG. 2.

As shown in FIG. 1, the environment-friendly vehicle in accordance with an embodiment of the present invention includes a controller 150 which controls the rear-wheel driver 110 and the rear-wheel reducer 120 such that each of the first motor 111 and the second motor 112 of the rear-wheel driver 110 is independently controlled with regard to a driving operation or is independently controlled with regard to a regeneration operation.

As shown in the drawings, the controller 150 includes a motor control unit 151 which independently supplies drive power to each of the first and second motors 111 and 112, a hydraulic pressure controller 152 which generates hydraulic pressure in the rear-wheel reducer 120, and a vehicle control unit 153 which is electrically coupled to the motor control unit 151 and the hydraulic pressure controller 152 and configured to control the operation of the motor control unit 151 and the operation of the hydraulic pressure controller 152.

The motor control unit 151 is configured to independently control the driving or regeneration of the first motor 111 and the second motor 112 in such a way as to simultaneously or selectively supply high-voltage power from a battery to the first motor 111 and the second motor 112 through a high-voltage line in response to a control signal of the vehicle control unit 153, or collect energy from the first motor 111 and the second motor 112.

The motor control unit 151 is electrically coupled to each of the first motor 111 and the second motor 112 through a motor control line and electrically coupled to the vehicle control unit 153 through a communication line.

The configuration of the motor control unit 151 in which power can be selectively supplied to the first motor 111 and the second motor 112 can be embodied by a technique well-known to those skilled in the art, and detailed description of the configuration of the motor control unit 151 will be omitted.

The hydraulic pressure controller 152 is configured to control the rear-wheel reducer 120 by selectively supplying hydraulic pressure to components, e.g., a brake 130, of the rear-wheel reducer 120, which is operated by hydraulic pressure, as will be described below, in response to a control signal of the vehicle control unit 153.

The hydraulic controller 152 is electrically coupled to the vehicle control unit 153 through the communication line and coupled to the brake 130 of the rear-wheel reducer 120 through a hydraulic pressure line.

Detailed configuration of the hydraulic pressure controller 152 will be described later with reference to FIG. 3.

The vehicle control unit 153 functions to control the operation of the front-wheel driver 21 and the operation of the rear-wheel driver 110 and the rear-wheel reducer 120. Here, the vehicle control unit 153 performs a function similar to that of a typical engine control unit (ECU). However, because the vehicle control unit 153 controls the overall operation of the front-wheel driver 21 and the operation of the rear-wheel driver 110, the vehicle control unit 153 is a generic superordinate concept to the engine control unit.

The vehicle control unit 153 receives information about intention of a driver which is input through a gear shift lever, an accelerator, and a steering wheel, and information about the vehicle from various kinds of sensors which are electrically coupled thereto through the communication line. The vehicle control unit 153 controls the operation of the front-wheel driver 21 and the rear-wheel driver 110 and distribution in drive force, taking into account the efficiency, the fuel efficiency, and the postural stability of the vehicle based on the received information.

When the intention of the driver to rapidly turn the vehicle in one direction (e.g., to the right) with respect to a movement direction of the vehicle is input while the vehicle moves at a high speed, the vehicle control unit 153 calculates the rotational moment of the vehicle, transmits to the motor control unit 151 a control signal to supply power to the motor (the first motor) that drives a corresponding one (the left rear wheel) of the opposite rear wheels which is disposed at the opposite side to the direction in which the vehicle is turned, and transmits to the motor control unit 151 a control signal not to supply power to the motor (the second motor) that drives the rear wheel (the right rear wheel) disposed at the side corresponding to the direction in which the vehicle is turned.

FIG. 2 illustrates the configuration of the rear-wheel driver 110 and the rear-wheel reducer 120 in accordance with an embodiment of the present invention.

As described above, the rear-wheel driver 110 includes the first motor 111 which independently drives the first rear wheel 51, and the second motor 112 which independently drives the second rear wheel 52.

A stator 111c of the first motor 111 and a stator 112c of the second motor 112 are fixed to a vehicle body. A first rotor shaft 111b which is an output end of a first rotor 111a of the first motor 111 is coupled to a first carrier 121a of a first planetary gear set 121, which will be described later herein. A second rotor shaft 112b which is an output end of a second rotor 112a of the second motor 112 is coupled to a second carrier 122a of a second planetary gear set 122.

Electric motors well-known to those skilled in the art may be used as the first motor 111 and the second motor 112 regardless of the kind or type, so long as they can respectively provide drive force required for the first rear wheel 51 and the second rear wheel 52.

However, in the apparatus 100 for driving rear-wheels according to the embodiment of the present invention, the first motor 111 and the second motor 112 are controlled by the motor control unit 151 such that they are separately and independently operated.

In the embodiment shown in the drawings, the first rear wheel 51 and the first motor 111 are disposed on the left side with respect to a direction toward the front of the vehicle, and the second rear wheel 52 and the second motor 112 are disposed on the right side with respect to a direction toward the front of the vehicle. However, the present invention is not limited to this.

As shown in FIG. 2, the rear-wheel reducer 120 includes the first planetary gear set 121 which is disposed between the first rear wheel 51 and the first rotor shaft 111b that is the output end of the first motor 111, the second planetary gear set 122 which is disposed between the second rear wheel 52 and the second rotor shaft 112b that is the output end of the second motor 112, and a ring gear 123 which is coupled at respective opposite sides thereof to the first planetary gear set 121 and the second planetary gear set 122.

The first planetary gear set 121 includes a first carrier 121a coupled to the output end of the first motor 111, a first sun gear 121b coupled to the first rear wheel 51, and a plurality of first planetary gears 121c which engage with an outer circumferential surface of the first sun gear 121b and an inner circumferential surface of the ring gear 123. The second planetary gear set 122 includes a second carrier 122a coupled to the output end of the second motor 112, a second sun gear 122b coupled to the second rear wheel 52, and a plurality of second planetary gears 122c which engage with an outer circumferential surface of the second sun gear 122b and the inner circumferential surface of the ring gear 123.

The ring gear 123 is releasably fixed to the vehicle body by the brake 130 which is hydraulically operated. The ring gear 123 has a cylindrical pipe shape, which is open on the opposite ends thereof. The first sun gear 121b of the first planetary gear set 121 and the second sun gear 122b of the second planetary gear set 122 respectively engage with the opposite ends of the ring gear 123.

When the first motor 111 and the second motor 112 are operated, the first rotor shaft 111b and the second rotor shaft 112b that correspond to the respective output ends of the first and second motors 111 and 112 are respectively coupled to the first carrier 121a and the second carrier 122a so that the drive force of the first motor 111 and the drive force of the second motor 112 are respectively transmitted to the first carrier 121a and the second carrier 122a.

Thereafter, because the first rear wheel 51 and the second rear wheel 52 are respectively directly coupled to the first sun gear 121b and the second sun gear 122b, decelerated drive forces of the first and second motors 111 and 112 are directly transmitted to the first rear wheel 51 and the second rear wheel 52 via the first sun gear 121b and the second sun gear 122b.

The hydraulic pressure controller 152 includes a hydraulic pump 152a which pressurizes hydraulic oil, a pump drive motor 152b which operates the hydraulic pump 152a, a hydraulic valve 152c which pressurized hydraulic oil to the brake 130, and a hydraulic control unit 152d which controls the operation of the pump drive motor 152b and opening or closing of the hydraulic valve 152c.

The hydraulic pump 152a functions to pressurize hydraulic oil supplied from a hydraulic oil storage unit 152e. The pump drive motor 152b operates using power supplied from the hydraulic pressure control unit 152d and transmits drive force to the hydraulic pump 152a. In detail, when the vehicle control unit 153 applies a control signal to the hydraulic control unit 152d so as to decouple the rear wheel from the rear-wheel driver, the hydraulic control unit 152d supplies power to the pump drive motor 152b and thus operates the hydraulic pump 152a.

The operation of the apparatus for driving rear-wheels for the environment-friendly vehicle in accordance with the embodiment of the present invention having the above-mentioned configuration will be described below.

First, the vehicle control unit 153 receives information about intention of the driver which is input through the gear shift lever, the accelerator, and the steering wheel, and information about the vehicle from various kinds of sensors which are electrically coupled thereto through the communication line. The vehicle control unit 153 controls the operation of the front-wheel driver 21 and the rear-wheel driver 110 and distribution in drive force, taking into account the efficiency, the fuel efficiency, and the postural stability of the vehicle based on the received information.

In detail, under normal driving conditions, the vehicle control unit 153 in accordance with an embodiment of the present invention controls the front-wheel driver 21 and the rear-wheel driver 110 such that, when the vehicle starts or moves at a low speed, only the rear-wheel driver 110 is operated to drive the rear wheels, taking into account the efficiency of the vehicle, in a manner similar to a typical electric vehicle (EV) or hybrid electric vehicle (HEV). In other words, the vehicle control unit 153 controls the front-wheel driver 21 and the rear-wheel driver 110 such that only the rear wheels 50 are driven.

When the speed of the vehicle exceeds a predetermined speed, in other words, when the vehicle moves at a high speed, the vehicle control unit 153 controls the front-wheel driver 21 and the rear-wheel driver 110 to drive only the front wheels 10. In this case, the hydraulic pressure controller 152 converts the brake 130 from a locked-on state to a locked-off state, thus preventing the first motor 111 and the second motor 112 from being damaged.

However, even when the vehicle moves at a high speed, if the handling stability and the postural stability of the vehicle are needed, for example, to rapidly turn the vehicle or change the lane, the vehicle control unit 153 controls the rear-wheel driver 110 so that predetermined drive force is transmitted to the rear wheels 50 that have not been driven.

In more detail, the vehicle control unit 153 calculates a rotational moment of the vehicle to optimally control the first motor 111 and the second motor 112 of the rear wheels during the direction change or lane change of the vehicle, and calculates the outputs of the first motor 111 and the second motor 112 for generating the calculated rotational moment. Subsequently, a control signal for instructing the first motor 111 and the second motor 112 to respectively independently the opposite rear wheels 50 using the calculated outputs is transmitted to the motor control unit 151 through the communication line. Then, the motor control unit 151 controls the first motor 111 and the second motor 112 of the rear wheels such that the first and second motors 111 and 112 are independently operated.

In this way, when the vehicle changes the direction or lane, the opposite rear wheels 50 are respectively independently operated by the first motor 111 and the second motor 112 of the rear wheels 50.

As shown in FIG. 4, when the vehicle changes the direction while moving at a high speed, the rear-wheel driver 110 is operated as follows.

First, if intention of the driver to rapidly change the direction of the vehicle to the right with respect to the travel direction of the vehicle is input to the vehicle control unit 153 while the vehicle moves at a high speed, the vehicle control unit 153 synthetically checks the above-mentioned information and calculates a needed rotational moment. Based on the calculated moment, the vehicle control unit 153 applies a control signal for driving the left rear wheel of the opposite rear wheels to the motor control unit 151. Then, the motor control unit 151 applies required power to the first motor 111 for driving the left rear wheel (the left rear wheel in the left diagram of FIG. 4), thus performing an operation of controlling the driving of the left rear wheel through the first motor 111.

Here, the motor control unit 151 controls the second motor 112 such that power is not supplied to the second motor 112 for driving the right rear wheel. The motor control unit 151 performs a regeneration control operation of recovering energy from the right rear wheel.

Furthermore, if intention of the driver to rapidly change the direction of the vehicle to the left with respect to the travel direction of the vehicle is input to the vehicle control unit 153 while the vehicle moves at a high speed, the vehicle control unit 153 synthetically checks the above-mentioned information and calculates a needed rotational moment. Based on the calculated moment, the vehicle control unit 153 applies a control signal for driving the right rear wheel of the opposite rear wheels to the motor control unit 151. Then, the motor control unit 151 applies required power to the second motor 112 for driving the right rear wheel (the right rear wheel in the right diagram of FIG. 4), thus performing an operating of controlling the driving of the right rear wheel through the second motor 112.

Here, the motor control unit 151 controls the first motor 111 such that power is not supplied to the first motor 111 for driving the left rear wheel. The motor control unit 151 performs a regeneration control operation of recovering energy from the left rear wheel.

According to the present invention, rear wheels are independently operated by drive forces of motors provided at respective opposite sides, so that not only can the longitudinal drive force of the vehicle be enhanced, but the handling stability of the vehicle can also be enhanced even when the vehicle rapidly changes the direction or the lane.

While the present invention has been described with respect to the specific embodiments, it will be apparent to those skilled in the art that various changes and modifications may be made without departing from the spirit and scope of the invention as defined in the following claims.

What is claimed is:

1. An apparatus for driving rear-wheels of an environment-friendly vehicle, which is configured to independently drive each of a first rear wheel and a second rear wheel of a vehicle, the apparatus comprising:
   a rear-wheel driver including a first motor configured to drive the first rear wheel, and a second motor configured to drive the second rear wheel;
   a rear-wheel reducer configured to decelerate drive force of the first motor and drive force of the second motor and transmit the respective decelerated drive forces to the first rear wheel and the second rear wheel;
   a brake configured to releasably fix the rear-wheel reducer to a vehicle body; and
   a controller configured to control the rear-wheel driver, the rear-wheel reducer, and the brake such that the first rear wheel and the second rear wheel are independently operated,
   wherein the rear-wheel reducer comprises:

a first planetary gear set disposed between an output end of the first motor and the first rear wheel;

a second planetary gear set disposed between an output end of the second motor and the second rear wheel; and a ring gear coupled at respective opposite sides thereof to the first planetary gear set and the second planetary gear set, wherein the first planetary gear set comprises:

a first carrier coupled to the output end of the first motor;

a first sun gear coupled to the first rear wheel; and a plurality of first planetary gears engaging with an outer circumferential surface of the first sun gear and an inner circumferential surface of the ring gear, and wherein the second planetary gear set comprises:

a second carrier coupled to the output end of the second motor;

a second sun gear coupled to the second rear wheel; and a plurality of second planetary gears engaging with an outer circumferential surface of the second sun gear and the inner circumferential surface of the ring gear.

2. The apparatus according to claim 1, wherein the brake is provided between the ring gear and the vehicle body and configured to releasably fix the ring gear to the vehicle body.

3. The apparatus according to claim 1, wherein the controller comprises:

a motor control unit configured to independently supply drive force to each of the first and second motors;

a hydraulic pressure controller configured to generate hydraulic pressure and supply the hydraulic pressure to the brake; and a vehicle control unit electrically coupled to the motor control unit and the hydraulic pressure controller and configured to control operation of the motor control unit and operation of the hydraulic pressure controller.

4. The apparatus according to claim 3, wherein the first rear wheel corresponds to a left rear wheel, and the second rear wheel corresponds to a right rear wheel.

5. The apparatus according to claim 4, wherein, when an intention of a driver to rapidly change a direction of the vehicle to the left with respect to a movement direction of the vehicle is detected while the vehicle moves, the vehicle control unit calculates a rotational moment of the vehicle, and transmits, to the motor control unit, a control signal for supplying power to the second motor for driving the second rear wheel, and then transmits a control signal to the motor control unit such that power is not supplied to the first motor for driving the first rear wheel.

6. The apparatus according to claim 5, wherein the vehicle control unit controls the motor control unit such that energy is recovered from the first rear wheel using the first motor.

7. The apparatus according to claim 4, wherein, when an intention of a driver to rapidly change a direction of the vehicle to the right with respect to a movement direction of the vehicle is detected while the vehicle moves, the vehicle control unit calculates a rotational moment of the vehicle, and transmits, to the motor control unit, a control signal for supplying power to the first motor for driving the first rear wheel, and then transmits a control signal to the motor control unit such that power is not supplied to the second motor for driving the second rear wheel.

8. The apparatus according to claim 7, wherein the vehicle control unit controls the motor control unit such that energy is recovered from the second rear wheel using the second motor.

* * * * *